(12) United States Patent
Steiner et al.

(10) Patent No.: US 8,904,647 B2
(45) Date of Patent: Dec. 9, 2014

(54) CABLE PREPARATION TOOL

(75) Inventors: Richard A. Steiner, East Haddam, CT (US); Charles Gargano, Guilford, CT (US)

(73) Assignee: Rostra Tool Company, Branford, CT (US)

( * ) Notice: Subject to any disclaimer, the term of this patent is extended or adjusted under 35 U.S.C. 154(b) by 610 days.

(21) Appl. No.: 13/290,226

(22) Filed: Nov. 7, 2011

(65) Prior Publication Data

US 2013/0111763 A1    May 9, 2013

(51) Int. Cl.
*B21F 13/00* (2006.01)
*H02G 1/12* (2006.01)

(52) U.S. Cl.
CPC .................................. *H02G 1/1224* (2013.01)
USPC ................ 30/90.1; 30/90.2; 30/91.2; 30/337; 30/342; 81/9.4; 81/9.44

(58) Field of Classification Search
USPC ................ 30/90.1, 90.2, 91.2, 329, 342, 349; 81/9.4, 9.44; 83/861, 879–881
See application file for complete search history.

(56) References Cited

U.S. PATENT DOCUMENTS

| | | |
|---|---|---|
| 4,059,893 A | 11/1977 | Solury |
| 4,130,031 A | 12/1978 | Wiener et al. |
| 5,826,338 A | 10/1998 | Chilton et al. |
| 6,128,976 A | 10/2000 | Tarpill |
| 6,253,641 B1 | 7/2001 | Tarpill |
| 6,282,995 B1 | 9/2001 | Lin |
| 6,526,661 B1 | 3/2003 | Shutts et al. |
| 6,964,288 B2 | 11/2005 | Christopher et al. |
| 7,216,431 B2 | 5/2007 | Holliday et al. |
| 7,318,272 B1 | 1/2008 | Steiner |
| D693,198 S | 11/2013 | Hutchfield et al. |
| 2013/0111763 A1 | 5/2013 | Steiner et al. |

*Primary Examiner* — Boyer D Ashley
*Assistant Examiner* — Richard Crosby, Jr.
(74) *Attorney, Agent, or Firm* — Cantor Colburn LLP

(57) ABSTRACT

A tool is provided for preparing a cable for crimping. The tool includes a first pressure arm and a second pressure arm. An intermediate member is disposed between the first pressure arm and the second pressure arm, the intermediate member being rotationally coupled to the first pressure arm by a first pivot and rotationally coupled to the second pressure arm by a second pivot. The intermediate member includes a first pair of slots adjacent the first pressure arm and a second pair of slots adjacent the second pressure arm. A first pair of stripping cartridges is removably coupled to the first pair of slots. A second pair of stripping cartridges removably coupled to the second pair of slots.

20 Claims, 9 Drawing Sheets

CABLE PREPARATION TOOL

BACKGROUND OF THE INVENTION

The subject matter disclosed herein relates to a tool for preparing cables for coupling to a connector, and in particular to a tool capable of preparing multiple size cables and having features to remove desired layers of the cable.

Cables, such as coaxial cables for example, are widely used to transmit electrical and communication signals from one location to another. These cables typically have multiple layers including a center conductor surrounded by a foam core and an outer insulator. These cables may have further layers, such as a foil layer around the foam core and a braided metal layer between the foil and the outer insulator. These layers provide additional protection against electromagnetic interference from surrounding objects.

Cables may be purchased at predefined lengths with connectors on each end. However, for users that utilize large amounts of cable, this may be inefficient. These types of users may purchase their cable in bulk on reels. The operators remove the wire from the reel and route it from the first location to a second location. To couple the cable with an end device or other cables, the operator must couple a connector to the cable, usually by crimping the connector on to the end of the cable. Crimping is a process of placing the cable into the connector and squeezing the connector with a tool in a way that deforms a portion of the connector and secures it to the cable.

Before the connector is attached by compressing it axially, the end of the cable needs to be properly prepared. First the outer insulator is cut off and removed. The braided metal layer is then folded back to expose the foil layer. The foil layer is cut and removed. A second braided layer is folded back leaving only the foil covered foam core and center conductor on the end of the cable. The foam core/center conductor end is then inserted into the connector and then the connector is compressed axially. It should be appreciated that it is desirable to have a secure cable preparation and compression, otherwise the connection may degrade or stop working over time. Due to the tight clearances between the foil covered foam core and the connector, if the foil covered foam core is deformed slightly during the preparation process, the leading edge of the foil may not fit smoothly into the connector and may bunch up. This may result in a poor assembly of the connector to the cable resulting in the installer having to start over.

Further, it should be appreciated that cables come in multiple sizes and that the installer may have to carry multiple tools to accomplish the cable preparation process. This may result in lost time when the installer has to leave the location of the cable to retrieve the correct tool. In other instances, the installer may use a tool intended for a different size to prepare the cable, often resulting in a less desirable connection to the connector.

Accordingly, while existing cable preparation tools are suitable for their intended purposes the need to improvement remains, particularly in providing a cable preparation tool that can prepare multiple size cables provide a cutting venue for foil removal and reduce the risk of the foil covered foam core being deformed during the assembly of the connector to the coax cable.

BRIEF DESCRIPTION OF THE INVENTION

According to one aspect of the invention, a tool is provided having a first pressure arm and a second pressure arm. An intermediate member is disposed between the first pressure arm and the second pressure arm, the intermediate member being rotationally coupled to the first pressure arm by a first pivot and rotationally coupled to the second pressure arm by a second pivot. The intermediate member further having a first pair of slots adjacent the first pressure arm and a second pair of slots adjacent the second pressure arm. A first pair of stripping cartridges is removably coupled to the first pair of slots. A second pair of stripping cartridges is removably coupled to the second pair of slots.

According to another aspect of the invention, a tool is provided having a first pressure arm with a first slot on a first side. A second pressure arm having a second slot on a second side is arranged opposite the first slot. An intermediate member is disposed between the first pressure arm and the second pressure arm, the intermediate member being rotationally coupled to the first pressure arm by a first pivot and rotationally coupled to the second pressure arm by a second pivot. The intermediate member further having at least one third slot adjacent the first pressure arm and at least one fourth slot adjacent the second pressure arm. At least one first stripping cartridge is removably coupled to the at least one third slot. At least one second stripping cartridge is removably coupled to the at least one fourth slot. Wherein the first slot and the at least one first stripping cartridge define a first cable preparation cavity, the first cable preparation cavity being longitudinally aligned with the first pivot. The second slot and the at least one second stripping cartridge also define a second cable preparation cavity, the second cable preparation cavity being longitudinally aligned with the second pivot.

According to yet another aspect of the invention, A tool for preparing a cable having a center conductor surrounded by a foil covered foam core is provided. The tool includes a first pressure arm. An intermediate member is rotationally coupled to the first pressure arm by a first pivot the intermediate member having a first slot adjacent the first pressure arm. The intermediate member further having a first opening in a first side, the first opening having a surface disposed between the first side and a second side. The intermediate member still further having a second opening extending through the surface and the second side, wherein the first opening is sized to receive the foam core and the second opening is sized to receive the center conductor. A first stripping cartridge is removably coupled to the first slot. A second stripping cartridge is removably coupled to the second slot.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Figure 1:
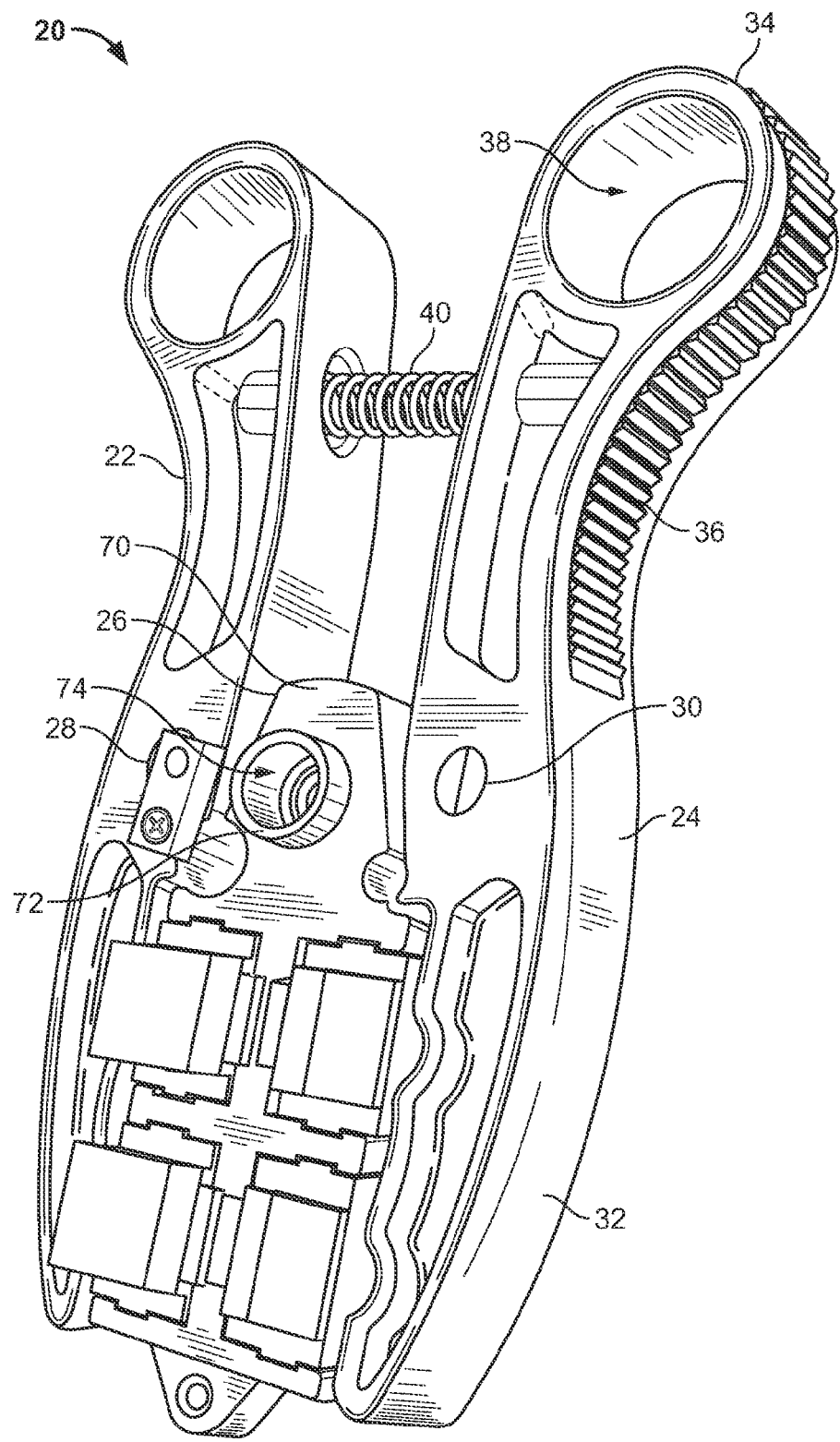
FIG. 1 is a perspective view of a cable preparation tool in accordance with an embodiment of the invention.
Figure 2:
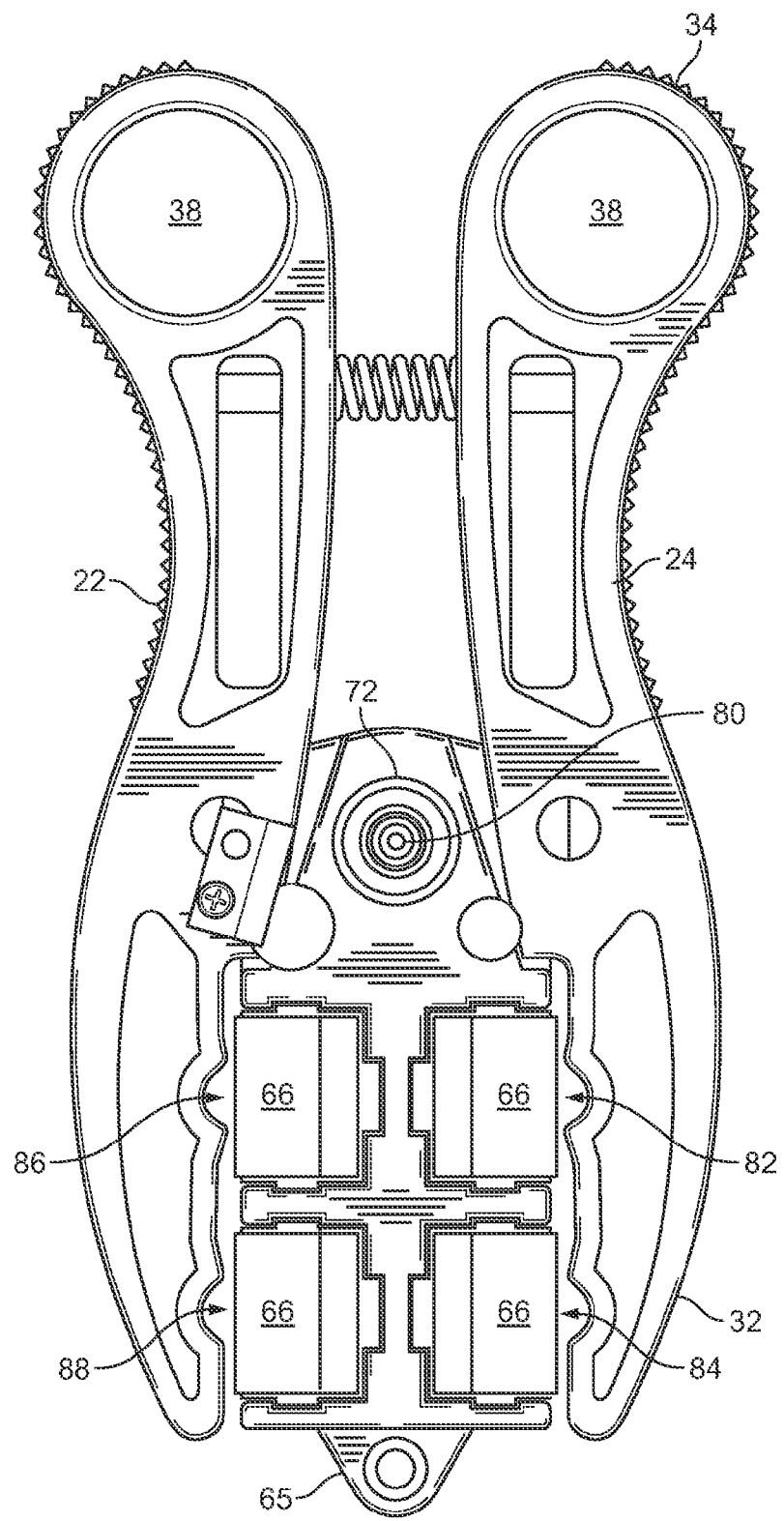
FIG. 2 is a first side plan view of the tool of FIG. 1.
Figure 3:
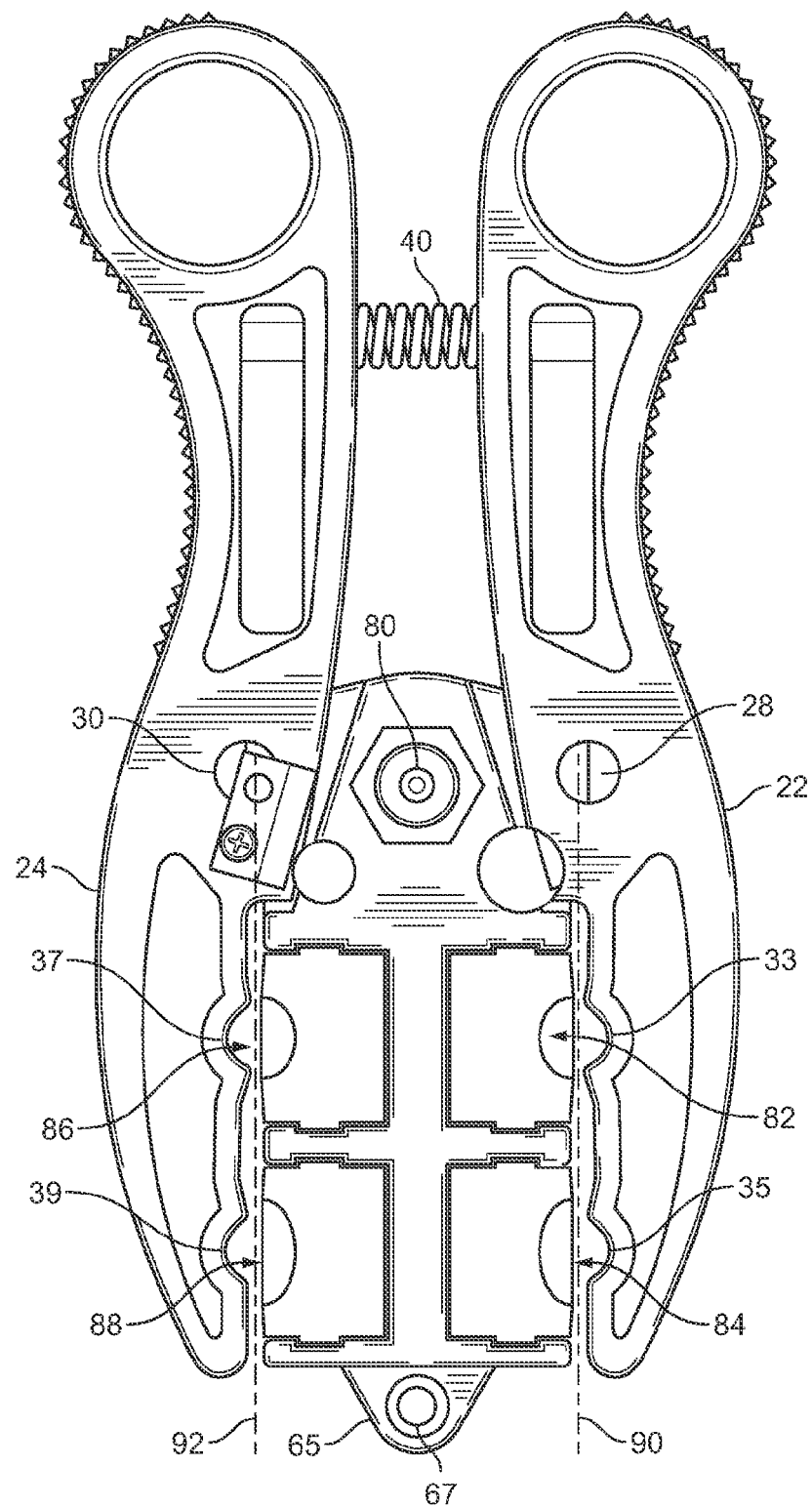
FIG. 3 is a second side plan view of the tool of FIG. 1.
Figure 4:
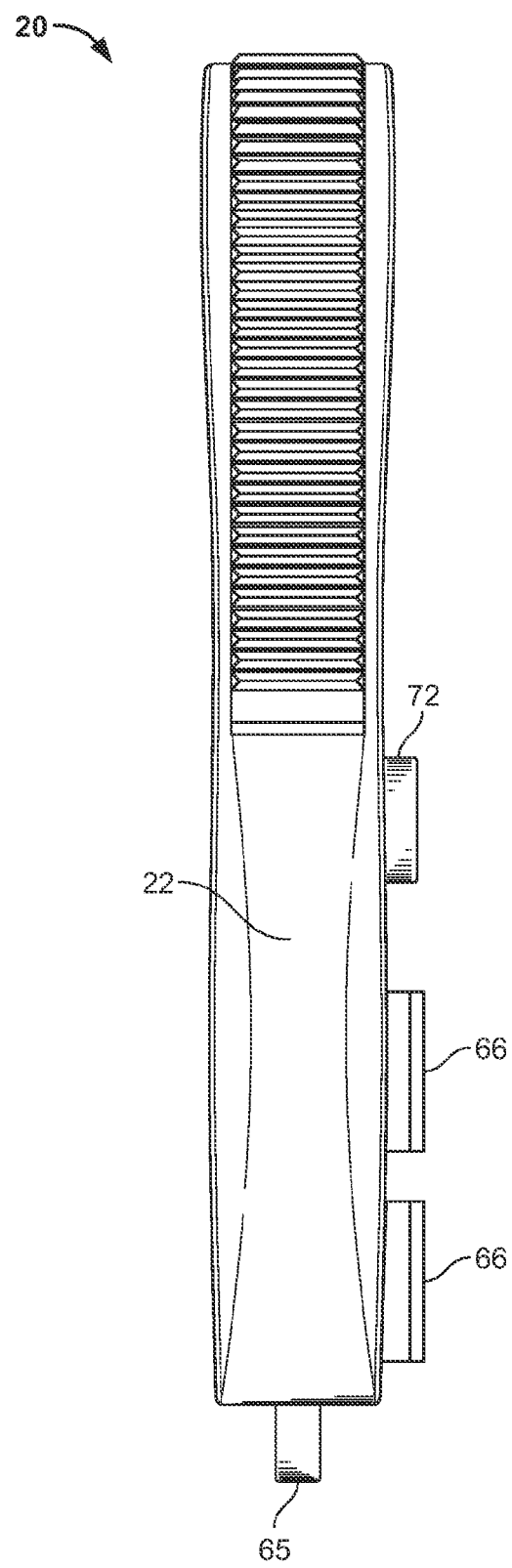
FIG. 4 is a third side elevational view of the tool of FIG. 1.
Figure 5:
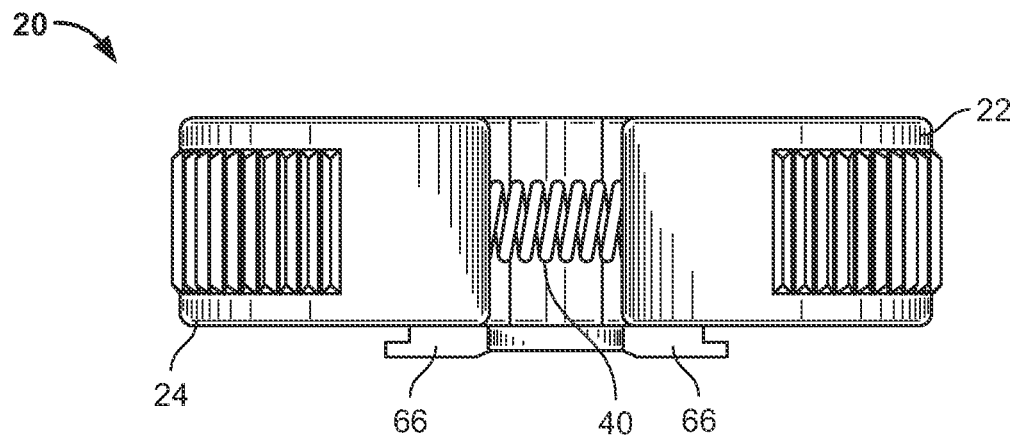
FIG. 5 is a first end view of the tool of FIG. 1.
Figure 6:
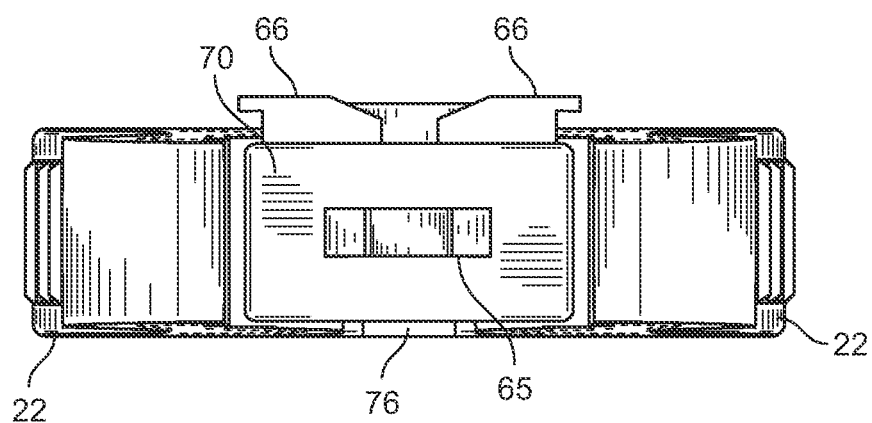
FIG. 6 is a second end view of the tool of FIG. 1.
Figure 7:
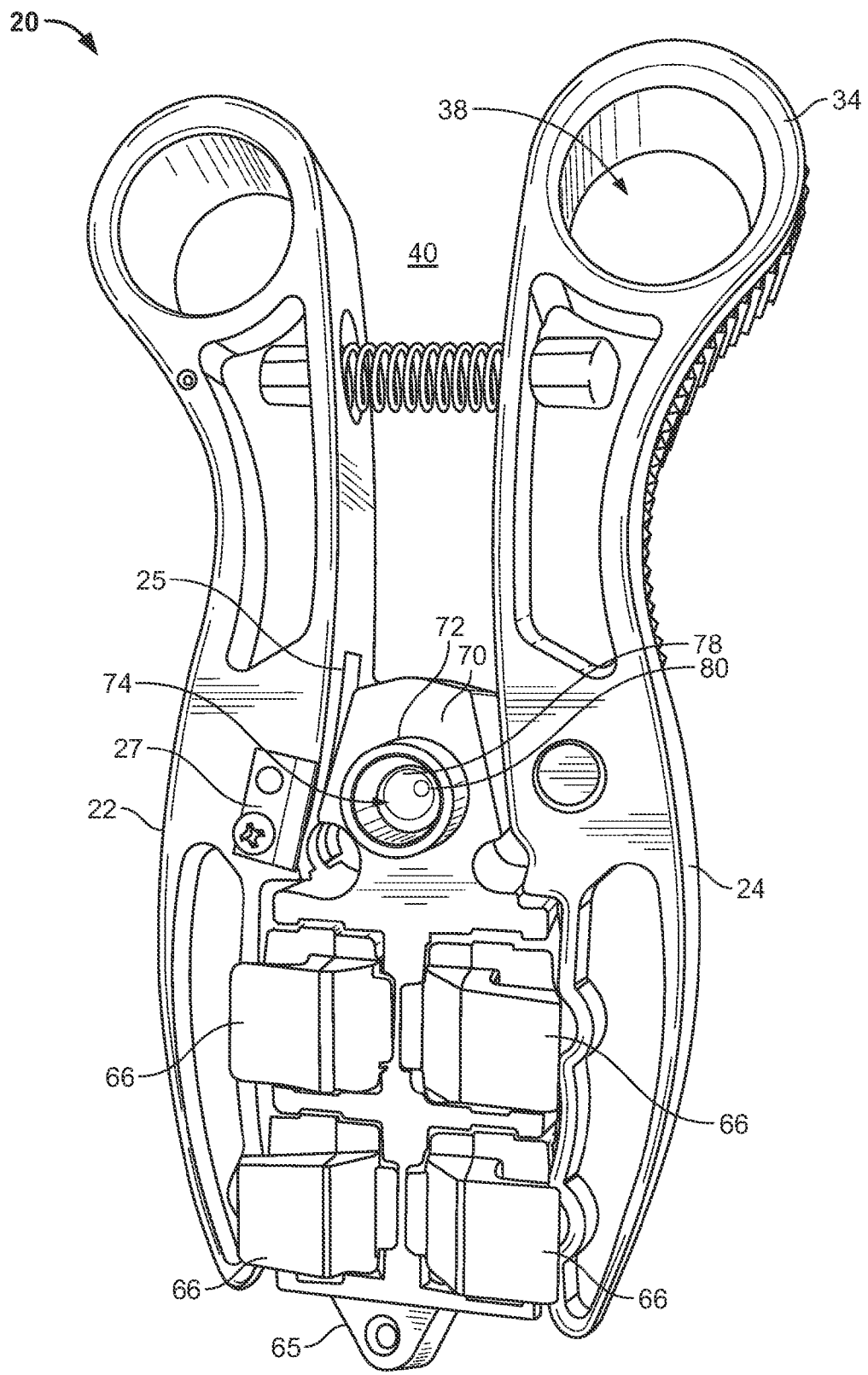
FIG. 7 is a second perspective view of the tool of FIG. 1.
Figure 8:
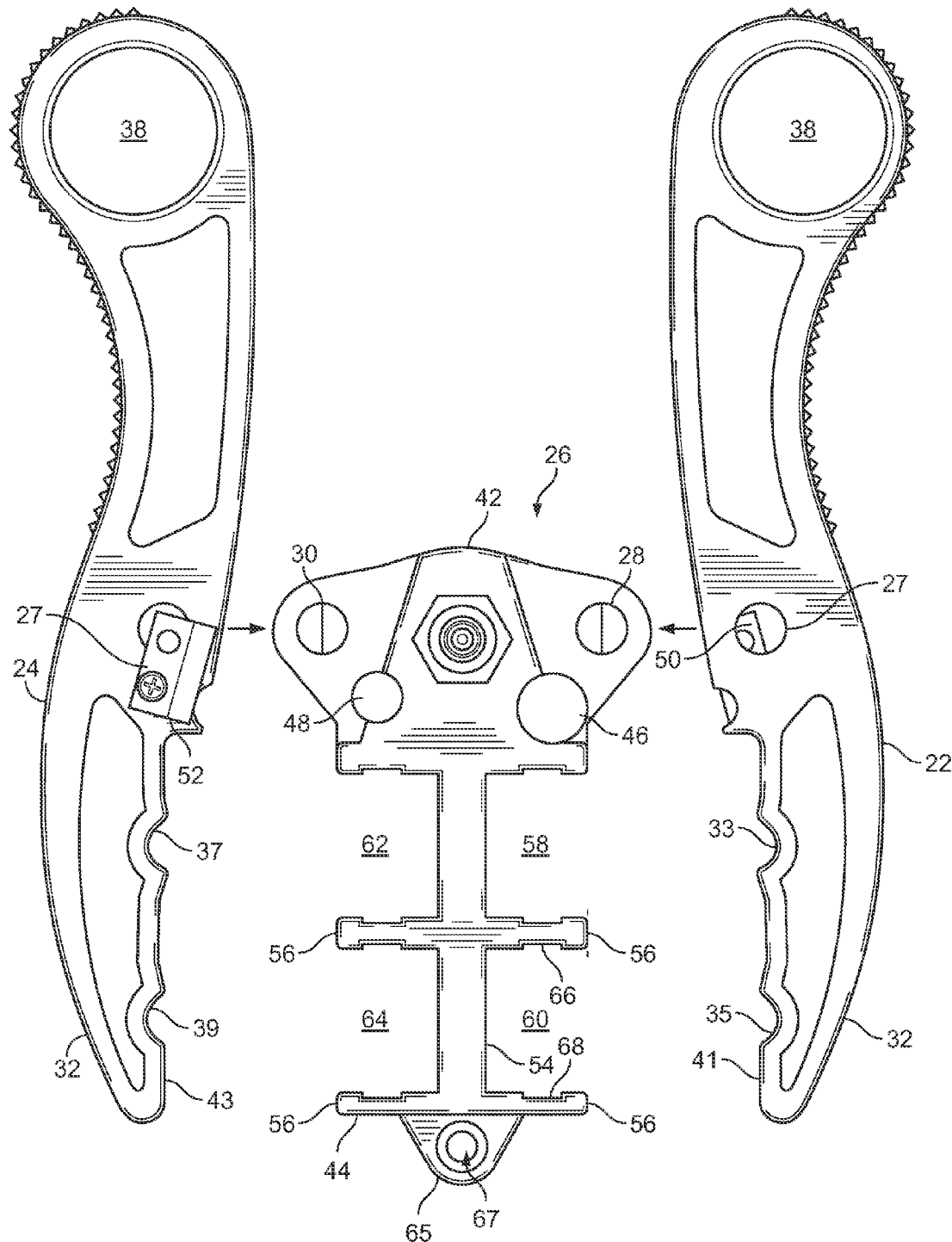
FIG. 8 is a partial exploded view of the tool of FIG. 1.

The detailed description explains embodiments of the invention, together with advantages and features, by way of example with reference to the drawings.

DETAILED DESCRIPTION OF THE INVENTION

Embodiments of the present invention provide for a tool capable of preparing multiple size cables, such as coaxial cables. Embodiments of the invention provide advantages in allowing four different cable sizes or cable types to be prepared with a single tool. Embodiments of the invention provide advantages in allowing one arm to be actuated at a time. Embodiments of the invention provide advantages in stripping and cutting by aligning pivot for the pressure arm with a cable preparation cavity. Embodiments of the invention provide still further advantages in the cutting of foil layers having different diameters. Still further embodiments of the invention provide advantages in providing features that round over the foam core to facilitate insertion of the cable into a connector.

Referring to FIGS. 1-8 a tool 20 is shown for preparing cables for coupling to a connector. The tool 20 includes a first pressure arm 22 and a second pressure arm 24. An intermediate member 26 is coupled to the first pressure arm by a first pivot 28 and to the second pressure arm by a second pivot 30. As will be discussed in more detail below, the pressure arms 22, 24 are movable between an open position which allows an operator to insert a cable into a cable preparation cavity and a closed position. The pressure arms 22, 24 each have a first portion 32 on one side of the pivots 28, 30 and a second portion 34 on the opposite side of the pivots 28, 30. The second portions 34 include a curved surface 36 that is sized to allow the operator to comfortably grip the tool 20. Each second portion 34 further includes a loop opening 38 that is sized to receive the installer's fingers to assist with actuating the tool 20. A spring 40 is arranged to bias the pressure arms 22, 24 in a closed position.

The first portion 32 of first pressure arm 22 includes a pair of slots 33, along a side 41 that is adjacent the intermediate member 26. Similarly, the second pressure arm 24 includes a pair of slots 37, 39 a side 43 that is adjacent the intermediate member 26. As will be discussed in more detail below, the slots 33, 35, 37, 39 cooperate with stripping cartridges to form cable preparation cavities. In one embodiment, the slots 33, 35, 37, 39 are semi-circular and have a center axis that is substantially longitudinally aligned with the respective pivots 28, 30. In the exemplary embodiment, the pressure arms 22, 24 are made from a durable plastic material, such as but not limited to acetal resin material for example.

The intermediate member 26 has a first portion 42 and a second portion 44. The first portion 42 includes the first pivot 28 and the second pivot 30. In the exemplary embodiment, the pressure arms 22, 24 are coupled to the pivots 28, 30 by a snap fit. In one embodiment, the pressure arms 22 have a slot 25 sized to receive the intermediate member 26 and allow the pivots 28, 30 to be inserted into opening 27 in the pressure arms 22, 24 Adjacent the pivots 28, 30 are a pair of openings 46, 48. The openings 46, 48 have different diameters to accommodate different size cables. In one embodiment, the tool 20 has cutting devices 50, 52 disposed adjacent the openings 48, 50. In one embodiment, the cutting devices 50, 52 are disposed on opposing sides of the pressure arms 22, 24. The cutting devices 50, 52 each have an edge that is disposed to overlap the respective openings 46, 48 when the pressure arms 22, 24 are in the closed position. The cutting devices 50, 52 may be a metal blade.

Figure 9:
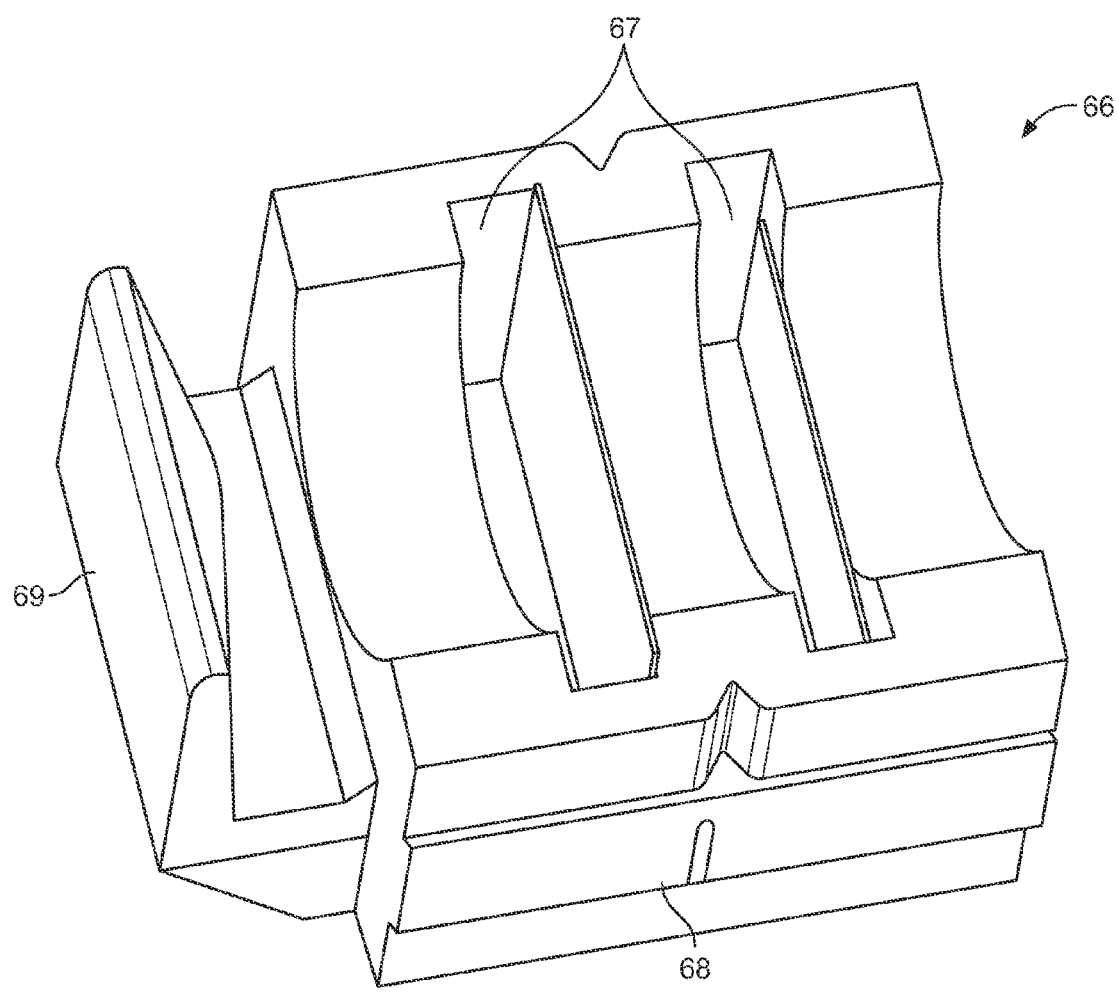
FIG. 9 is a perspective view of a stripping cartridge for use with the tool of FIG. 1.

The second portion 44 includes a stem 54 having one or more arms 56 that define slots 58, 60, 62, 64. In one embodiment, the second portion includes a projection 65 having an opening 67 to facilitate storage of the tool 20. The slots include a first pair of slots 58, 60 that have an open side facing the side 41 of first pressure arm 22. A second pair of slots 62, 64 has an open side facing the side 43 of second pressure arm 24. The slots 58, 60, 62, 64 are sized to receive stripping cartridges 66 (FIG. 9). The stripping cartridge 66 may be a standard cartridge such as Model 8780ES manufactured by Rostra Tool Company. In one embodiment, the tool 20 has four different stripping cartridges sized to prepare different size or types of cables. Each of the slots 58, 60, 62, 64 may include a pair of opposing slots 66, 68 that cooperate with ribs 70 on the stripping cartridge 66 to align and retain the stripping cartridge 66. The stripping cartridges 66 may include one or more cutting features 67, such as a metal blade for example. The cutting features 67 are disposed within a recess 71. A tab portion 69 may be provided to facilitate insertion and removal of the stripping cartridge 66 from the tool 20.

As will be discussed in more detail below, the stripping cartridges 66 are removably coupled to the slots 58, 60, 62, 64 and allow the operator to prepare multiple sizes of cables with a single tool 20. In the exemplary embodiment, the second portion 44 includes slots to accommodate four stripping cartridges 66. In other embodiments, the second portion 44 includes slots for two stripping cartridges 66. In still other embodiments more than four stripping cartridges 66 may be accommodated.

On a first side 70 of the intermediate member 26 is a projection 72. The projection includes a thin wall portion that defines a cylindrical opening 74. The opening 74 extends into the body of the intermediate member 26 towards a second side 76. The opening 74 includes an inner surface 78. In the exemplary embodiment, the inner surface 78 is curved. As will be discussed in more detail, the surface 78 is arranged to shape the foam core of a cable to facilitate insertion into a connector. The surface 78 may also have other shapes that taper the end of the foam core, these shapes include but are not limited to a conical shape for example. Extending through the surface 78 is an opening or hole 80. The hole 80 is sized to receive the center conductor of the cable when the foam core is inserted into the opening 74. In one embodiment, the intermediate member 26 may have features on the second side 76 that accept the end of a connector to increase the comfort to the operator when forming the end of the foam core.

When assembled, the pressure arms 22, 24 are movable between a closed position (shown) and an open position. When in the open position, the spring 40 is compressed, allowing a gap to open between one of the pressure arms 22, 24 and the adjacent stripping cartridges 66. In the exemplary embodiment, the pressure arms 22, 24 rotate independently from each other to allow the operator to move only one of the pressure arms to open a gap adjacent the desired stripping cartridge 66. This gap is sufficiently sized to allow a cable to be inserted into one of the cable preparation cavities 82, 84, 86, 88 (FIG. 3) that are defined by corresponding slots 33, 35, 37, 39 and recess 71 in the adjacent stripping cartridge 66. The cavities 82, 84 adjacent the first pressure arm 22 define a line 90 that substantially intersects the pivot 28. In other words, the cavities 82, 84 are longitudinally aligned with the pivot 28. Similarly, the cavities 86, 88 define a line 92 that intersects the pivot 30 such that the cavities 86, 88 are longitudinally aligned with the pivot 30. The alignment of the cavities 82, 84, 86, 88 with the respective pivots 28, 30 provides advantages in cutting and stripping of the cable by reducing the risk that the tool 20 will open while the operator is in the process of preparing the cable.

Figure 10:
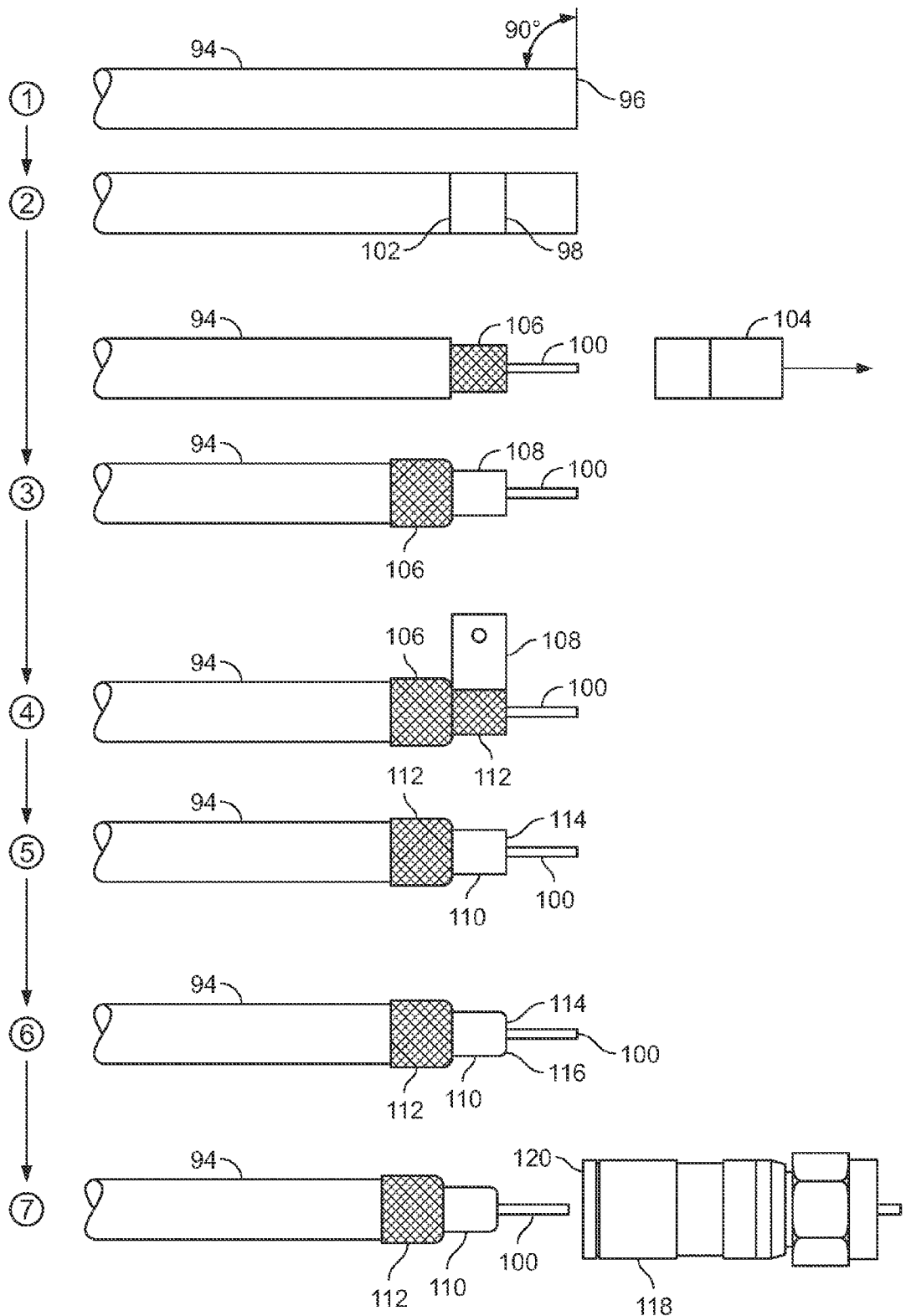
FIG. 10 is an illustration of a cable being prepared for coupling with a connector.

To operate the tool 20, the installer selects the desired cable 94 (FIG. 10) and squares off the end 96. The end 96 is inserted into one of the cable preparation cavities, such as cavity 82 for example, by squeezing the adjacent of the pressure arm, such as pressure arm 22 for example. In the exemplary embodiment, the stripping cartridge 66 has two cutting members 67 with the member 67 closest to the tab 69 being slightly offset from the other member 67 such that one of the member 67 makes a cut 98 through several layers of the cable to the center conductor 100 while the other member makes a cut 102 that extends through only the outer insulation layer. The operator rotates the tool 20 several times to form cuts cylindrically about the cable. By pulling the cable 94 transverse to the tool 20, the installer in a single step removes the desired portions 104 of the cable 94 to expose the braided layer 106.

Next, the braided layer 106 of the cable 94 is folded back to expose the foil layer 108 of the cable 94. The cable 94 is then inserted into the opening 46, 48 that corresponds to the size of the cable 94 by pressing on the adjacent pressure arm 22, 24. It should be appreciated that the cable 94 is inserted into the openings on the same side as the cutting device 50, 52. With the cable 94 inserted, the adjacent pressure arm is released allowing the cutting device to engage the foil layer 108 of the cable 94. The operator rotates the tool 20 one revolution to form a score line around the foil layer 108. By squeezing the pressure arm, the cable 94 is released and may be removed from the tool 20. The scoring of the foil layer 108 allows the operator to remove the foil layer 108 from the cable 194 while reducing the risk of cutting the inner braid layer 112. With the foil layer removed, a second braided layer 112 may be exposed and folded back to reveal the foil covered foam core 110. Finally, the operator inserts the foil covered foam core 110 and center conductor 100 into the opening 74 with the center conductor 100 extending through the hole 80. The end 114 of the form core layer is pressed against the surface 78 and rotated between the operator's fingers. The pressing and rotation of the core and foil layer against the surface 78 forms a curved 116 or tapered end on the leading edge of core and foil layer 110. This provides advantages in facilitating the insertion of the cable 94 into the connector 118 without the foil layer 110 catching the edge 120 of the connector 118 and deforming or bunching up.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A tool comprising:
   a first pressure arm;
   a second pressure arm;
   an intermediate member disposed between the first pressure arm and the second pressure arm, the intermediate member being rotationally coupled to the first pressure arm by a first pivot and rotationally coupled to the second pressure arm by a second pivot, the intermediate member having a first pair of slots adjacent the first pressure arm and a second pair of slots adjacent the second pressure arm;
   a first pair of stripping cartridges is removably coupled to the first pair of slots; and,
   a second pair of stripping cartridges removably coupled to the second pair of slots.

2. The tool of claim 1 wherein the intermediate member includes a first opening having a first diameter adjacent the first pressure arm and a second opening having a second diameter adjacent the second pressure arm, the first diameter being larger than the second diameter.

3. The tool of claim 2 further comprising:
   a first cutting member coupled to the first pressure arm, the first cutting member having a first edge adjacent the first opening; and,
   a second cutting member coupled to the second pressure arm, the second cutting member having a second edge adjacent the second opening.

4. The tool of claim 1 wherein the first pressure arm has a pair of third slots on a side adjacent the first pair of stripping cartridges, the pair of third slots cooperating with the first pair of stripping cartridges to define a pair of cable preparation cavities, the pair of cable preparation cavities being longitudinally aligned with the first pivot.

5. The tool of claim 1 wherein the intermediate member includes a third opening in one side adjacent the first pivot, the third opening having a surface between the first side and a second side, the intermediate member further having a fourth opening extending through the surface and the second side, the third opening being sized to receive a foil covered cable foam core and the fourth opening being sized to receive a cable center conductor.

6. The tool of claim 5 wherein the surface is curved.

7. The tool comprising:
   a first pressure arm having a first slot on a first side;
   a second pressure arm having a second slot on a second side opposite the first slot;
   an intermediate member disposed between the first pressure arm and the second pressure arm, the intermediate member being rotationally coupled to the first pressure arm by a first pivot and rotationally coupled to the second pressure arm by a second pivot, the intermediate member having at least one third slot adjacent the first pressure arm and at least one fourth slot adjacent the second pressure arm;
   at least one first stripping cartridge removably coupled to the at least one third slot;
   at least one second stripping cartridge removably coupled to the at least one fourth slot; and,
   wherein the first slot and the at least one first stripping cartridge define a first cable preparation cavity, the first cable preparation cavity being longitudinally aligned with the first pivot, and wherein the second slot and the at least one second stripping cartridge define a second cable preparation cavity, the second cable preparation cavity being longitudinally aligned with the second pivot.

8. The tool of claim 7 wherein the intermediate member includes a first opening adjacent the first pressure arm and a second opening adjacent the second pressure arm.

9. The tool of claim 8 further comprising:
   a first cutting member coupled to the first pressure arm, the first cutting member having a first edge adjacent the first opening; and, a second cutting member coupled to the second pressure arm, the second cutting member having a second edge adjacent the second opening.

10. The tool of claim 7 wherein the intermediate member includes a third opening in a first side, the third opening having a surface disposed between the first side and a second side of the intermediate member, the intermediate member further having a fourth opening extending through the surface and the second side.

11. The tool of claim 10 wherein the surface is curved.

12. The tool of claim 7 wherein the intermediate member includes a fifth slot adjacent the at least one third slot and a sixth slot adjacent the at least one fourth slot.

13. The tool of claim 12 further comprising:
a third stripping cartridge removably coupled to the fifth slot; and,
a fourth stripping cartridge removably coupled to the sixth slot.

14. A tool for preparing a cable having a center conductor surrounded by a foil covered foam core, the tool comprising:
a first pressure arm;
an intermediate member rotationally coupled to the first pressure arm by a first pivot the intermediate member having a first slot adjacent the first pressure arm, the intermediate member having a first opening in a first side, the first opening having a surface disposed between the first side and a second side, the intermediate member further having a second opening extending through the surface and the second side, wherein the first opening is sized to receive the foil covered foam core and the second opening is sized to receive the center conductor; and,
a first stripping cartridge removably coupled to the first slot.

15. The tool of claim 14 wherein the surface is shaped to curve a leading edge portion of the foil covered foam core.

16. The tool of claim 15 further comprising a second pressure arm coupled to the intermediate member by a second pivot.

17. The tool of claim 16 further comprising a second stripping cartridge, wherein the intermediate member includes a second slot adjacent the second pressure arm and the second stripping cartridge is removably coupled to the second slot.

18. The tool of claim 17 wherein the intermediate member includes a third opening adjacent the first pressure arm and a fourth opening adjacent the second pressure arm.

19. The tool of claim 18 further comprising:
a first cutting member coupled to the first pressure arm, the first cutting member having a first edge adjacent the third opening; and,
a second cutting member coupled to the second pressure arm, the second cutting member having a second edge adjacent the fourth opening.

20. The tool of claim 19 further comprising a spring, wherein the first pressure arm includes a first portion opposite the first stripping cartridge from the first pivot and the second pressure arm includes a second portion opposite the second stripping cartridge from the second pivot, the spring being disposed between the first portion and the second portion.

* * * * *